G. A. ANDERSON.
SPRING RIGGING FOR VEHICLES.
APPLICATION FILED SEPT. 8, 1913.

1,137,720.

Patented Apr. 27, 1915.
2 SHEETS—SHEET 1.

Witnesses

Inventor:
Gustaf A. Anderson,
By Bradford & Doolittle,
Attorneys.

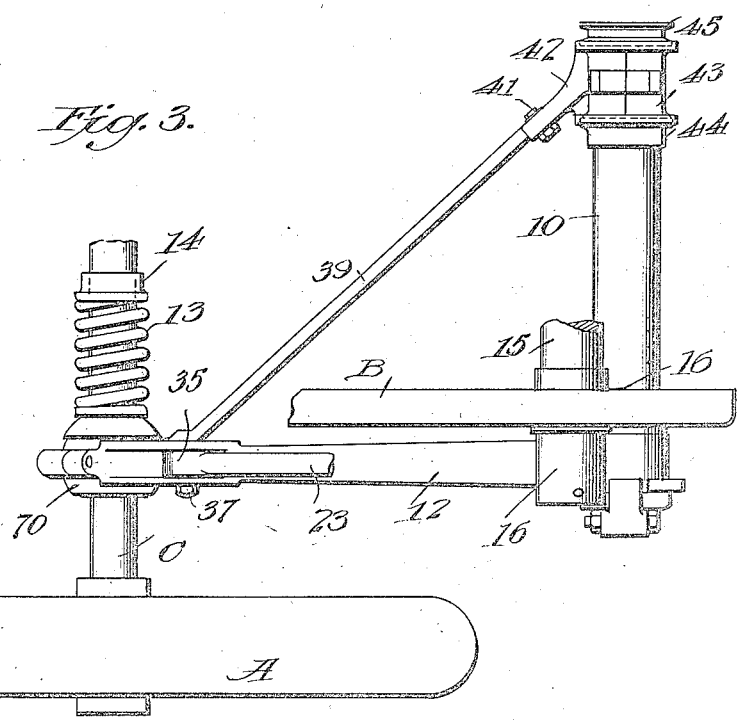
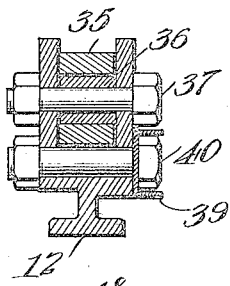
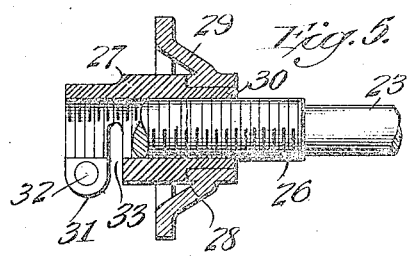
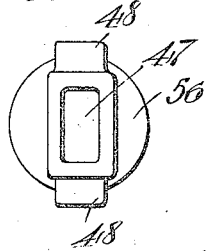
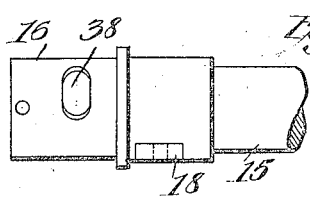
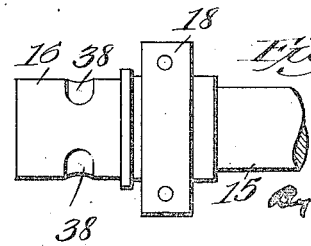

UNITED STATES PATENT OFFICE.

GUSTAF ARVID ANDERSON, OF WAYNESBORO, PENNSYLVANIA.

SPRING-RIGGING FOR VEHICLES.

1,137,720.  Specification of Letters Patent.  Patented Apr. 27, 1915.

Application filed September 8, 1913. Serial No. 788,662.

*To all whom it may concern:*

Be it known that I, GUSTAF A. ANDERSON, a citizen of the United States, residing at Waynesboro, Franklin county, and State of Pennsylvania, have invented and discovered certain new and useful Improvements in Spring-Rigging for Vehicles, of which the following is a specification.

My present invention consists in a spring rigging for vehicles of the same general nature and purposes as set forth in my other application No. 788,633 filed herewith, but differing in the details of construction and arrangement, all as will be hereinafter more fully described and claimed.

Figure 1:
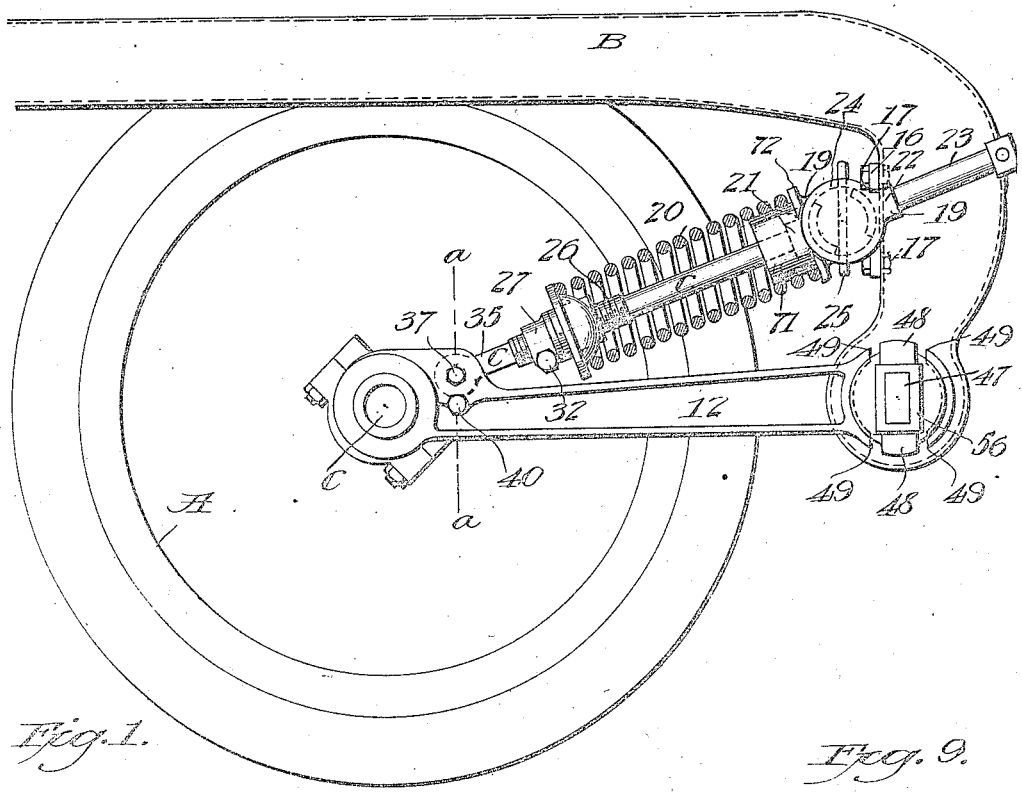
Figure 9:
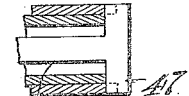
Figure 2:
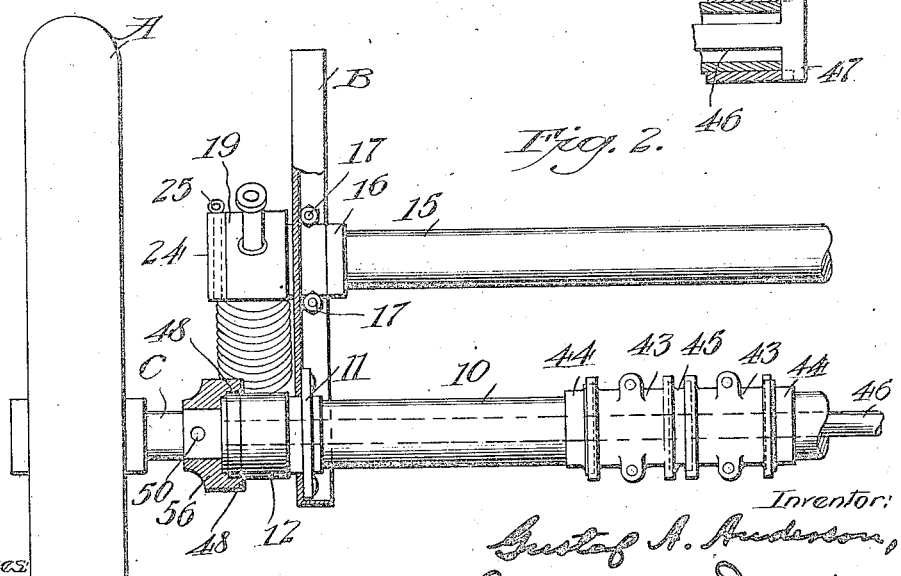

Referring to the accompanying drawings which are made a part hereof, and on which similar reference characters indicate similar parts, Figure 1 is a side elevation of a rear wheel of an automobile truck, and the rear end of one of the side bars of the chassis, equipped with a spring rigging of my improved construction, Fig. 2, a rear elevation of the parts forming the subject matter of my said invention, Fig. 3, a top or plan view of the parts shown in Fig. 2 with the spring omitted, Fig. 4, a detail section on dotted line $a$—$a$ in Fig. 1, and Figs. 5, 6, 7, 8, and 9, detailed views showing different features of construction more clearly, as will be pointed out specifically in the specification as said features are described.

In said drawings the portions marked A represent the vehicle wheel, B the side bars of the automobile-body frame, or chassis, and C the axle or axle casing, all of which parts are or may be of any appropriate material and construction.

In the drawings I have shown but one side of the machine, it being understood that the spring rigging on the other side is a duplicate of that shown.

The side bars B of the frame are bent downwardly at their rear ends, as indicated most clearly in Fig. 1, to a point where the lower ends are substantially on the same plane above the tread of the wheel as the axle C. Said lower ends of the side bars B are connected by a tubular cross member 10 which extends through an aperture at the lower end of each side bar and is rigidly secured at the point where it passes through said aperture to flanged rings 11, which in turn are riveted or bolted to said bars B. Levers 12 formed with appropriate eyes on their rear ends are mounted to rock on the projecting outer ends of tube 10. The front ends of said levers are connected by a universal sliding joint with axle C. Said universal joint comprises a sliding part 70 on which the forward end of the lever is adapted to swivel, and a rigid collar 14 secured to the axle, or axle casing, at an appropriate point toward the center line of the vehicle, and a stiff coiled spring 13 interposed between said rigid collar and said sliding part. This feature of the construction is substantially identical with corresponding parts shown in my above mentioned application and need not be described in detail herein.

A tubular cross member 15 is mounted a distance above the tubular cross member 10 in brackets 16 which are formed with integral flanges 18 (see Figs. 7 and 8) rigidly secured by bolts 17 to the front edge of the vertical portion of the side bars B. Castings 19 formed with appropriate eyes are rotatively mounted on the outer ends of said tubular member 15 and secured thereon by washers 24 and cotter pins 25 which extend through said washers and tubular member. Said castings 19 are each formed with a tubular portion 71 which extends toward the axle C and is surrounded at its rear end by a flange 72. Cylindrical bosses 21 and 22 are formed on each side of said castings drilled to provide a sliding fit with a rod 23, which has an eye at its front end 35 and is pivotally connected by a bolt 37 in a pocket in the front end of lever 12 adjacent with axle C and in line with the axis thereof. A furl 36 is preferably interposed between pivot bolt 37 and eye 35 to secure a large wearing surface with a comparatively small bolt. Near the front end of rod 23 it is formed with a threaded section 26 on which is mounted a sleeve 27 internally screw-threaded and adapted to be locked in any position desired on said screw-threaded portion by means of a clamping bolt 32 extending through ears 31 on one side of the front end of said sleeve, said front end being partially divided from the main portion of the sleeve by a transverse cut 33, adapted to give said portion sufficient flexibility to secure the clamping effect. Said sleeve 27 is formed with an annular shoulder 28 and a flanged washer, or bearing plate, 29 is mounted thereon to abut said shoulder, between which and the flange 72 of the casting 19 is mounted a stiff coiled spring 20, the upper end of said spring being mounted on tubular part 71 of said casting. These springs 20, one on either side, are thus adapted to support the load and resist the pressure between the truck and the car body. As the rods 23 extend through the outer tubular ends of bracket 16, said ends are formed with elongated apertures 38 on opposite sides (see Figs. 7 and 8) of a sufficient length to accommodate the rotary movement of casting 19 and rod 23.

Braces 39 (Fig. 3) serve to give lateral support and transmit lateral forces between the car body and its axle and wheels. One end of each of said braces is secured to the inside face of each lever 12 at its front end by a bolt 40, and the other end by bolt 41 to an arm 42, projecting from and integral with a divided sleeve 43 mounted to pivot on the tube 10 between rigid collars 44 and 45 thereon.

Axially to tube 10 is mounted therein a tempered spring-steel rod 46, formed with a T head 47 at each end, one of which heads (Fig. 9) engages a correspondingly formed recess or pocket in the outer face of the bearing part of lever 12. A casting 56 disk-shaped with a central rectangular aperture is secured on the other end by a cotter pin 50, the disk being adapted to fit in tubular part 10, while radial wings 48 extend into notches 49 in the opposite sides of the ends of lever 12, which notches are circumferentially longer than said wings, thus allowing one of said levers 12 to rotate a predetermined distance or angle in relation to the other, without engaging said wings with the sides of said notches. When rotating beyond said distance or angle, however, as will be readily understood, the sides of the notches come in contact with the sides of said wings and bring said spring rod 46 under a twisting or torsional strain, supplementing the spring 20.

In operation, the tension of springs 20 may be regulated by adjusting sleeve 27 to secure a mean height of the car body above the road bed, the tension being proportioned by the static load supported by said springs. In running over rough places or obstructions the springs 20 being of unusual length have a softness in operation which imparts comparatively slight shock or recoil to the car body as a result of the deflection caused by such operation. When the displacement of the wheel in relation to the car body frame extends beyond the predetermined point, the spring-rod 46 is brought into operation and its action supplements that of springs 20. In these particulars, as in many others, the operation of this construction is substantially the same as that of the construction forming the subject matter of my application before referred to.

Having thus fully described my said invention, what I claim as new and desire to secure by Letters Patent, is:

1. A spring rigging for vehicles comprising an axle, a body frame formed with depending arms at its rear end, levers pivotally mounted at one end on the axle of said truck and at the other end on parts carried on the lower end of said depending arms, rods connected at one end with said levers adjacent to the axles and mounted at their other ends to slide in parts on said depending arms of said frame, and springs interposed between parts carried by said rods adjacent to the axle and other parts connected with said depending arms through which said rods slide, substantially as set forth.

2. A spring rigging for vehicles comprising a truck, a body frame mounted on said truck and formed with depending arms at its rear end, levers extending in a substantially horizontal plane and pivoted at one end on an axle of said truck and at their other end on a part carried by said depending arms, rods connected at one end with said levers adjacent to the axle and slidably mounted in parts carried on said frame, and springs interposed between parts carried by said rods and the other parts connected with said frame through which said rods slide, substantially as set forth.

3. The combination with a vehicle and its axle, of a spring rigging comprising levers pivotally mounted at one end on said axle, and at the other end on depending members carried by said frame, rods connected at one end with said levers adjacent to the axle, a bearing mounted on said frame in which the other end of said rod is slidably mounted, a part adjustably mounted on said rod, a spring interposed between said adjustable part, and a bearing on said frame, substantially as set forth.

4. A spring rigging for vehicles comprising a truck, a body frame formed with side bars having depending portions at their rear ends, levers pivotally connected at one end of the rear axle of the truck and at the other end to journals carried by said depending portions, rods pivoted at their front ends to said levers adjacent to the axle and extending in a radial direction through a support carried by the frame at a point above said levers, a bearing plate mounted to be adjusted on said rod, a support carried by said frame, a coiled spring interposed between said bearing plate and said support, and a supplemental spring adapted to be brought into action at a predetermined point in the operation of said first mentioned spring, substantially as set forth.

5. A vehicle comprising a truck, a body, a pivotal and transversely sliding mounting between an axle of said truck and the frame of said body, springs interposed between said truck and body, means for adjusting the tension of said springs, and a supplemental spring mounted to be brought into action upon a certain disturbance of normal relations between the axle and body, substantially as set forth.

6. A vehicle comprising a truck, a body, a pivotal and sliding mounting between an axle of said truck and the frame of said body, a laterally disposed brace forming a part of said mounting and connected by a rocking connection with said frame at a point toward the center line of the vehicle, and springs interposed between said truck and body in position to receive and support the thrust of said body, substantially as set forth.

7. The combination with a vehicle frame and its axle, of a spring rigging comprising members depending from the rear of said frame, levers pivotally mounted at one end on said axle and at the other end on parts carried by said depending members, rods connected at one end with said levers, a bearing mounted on said frame in which the other end of said rod is slidably mounted, a spring interposed between the part carried on said rod and said bearing, and a supplemental spring adapted to coöperate with said first mentioned spring when the axle is abnormally deflected, substantially as set forth.

8. The combination with a vehicle and its axle, of a spring rigging comprising members depending from the rear of said frame, levers pivotally mounted at one end on said axle and at the other end on parts carried by said depending members, rods slidably mounted in a part carried on said frame and connected at one end to said levers, a spring interposed between a bearing adjustably mounted on said rods and said part carried by said frame, and an auxiliary spring connected with said depending members adapted to coöperate with said first mentioned springs when said levers become abnormally deflected by the movement of the axle either to or from the frame, substantially as set forth.

In witness whereof, I have hereunto set my hand and seal at Waynesboro, Pennsylvania, this sixth day of September, A. D. nineteen hundred and thirteen.

GUSTAF ARVID ANDERSON.

Witnesses:
GEO. B. BEAVER,
DANIEL S. BEARD.